US 011386088B2

(12) United States Patent
Halterman et al.

(10) Patent No.: US 11,386,088 B2
(45) Date of Patent: Jul. 12, 2022

(54) EXPRESSION PUSHDOWN OPTIMIZATION FOR QUERYING IN FEDERATED DATABASE SYSTEM

(71) Applicant: Oracle International Corporation, Redwood Shores, CA (US)

(72) Inventors: Jordan Christopher Halterman, Murrieta, CA (US); Jason Anthony Slepicka, Long Beach, CA (US); Colin James Schmidt, Playa Vista, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 16/874,551

(22) Filed: May 14, 2020

(65) Prior Publication Data
US 2020/0272627 A1 Aug. 27, 2020

Related U.S. Application Data

(63) Continuation of application No. 15/409,462, filed on Jan. 18, 2017, now Pat. No. 10,698,896.

(51) Int. Cl.
*G06F 16/00* (2019.01)
*G06F 16/2453* (2019.01)

(52) U.S. Cl.
CPC .. *G06F 16/24549* (2019.01); *G06F 16/24544* (2019.01)

(58) Field of Classification Search
None
See application file for complete search history.

(56) References Cited

U.S. PATENT DOCUMENTS

| 5,701,454 | A  | * | 12/1997 | Bhargava | G06F 16/24547 |
| 7,315,852 | B2 | * | 1/2008  | Balmin   | G06F 16/8365 |
|           |    |   |         |          | 707/999.005 |
| 7,685,150 | B2 | * | 3/2010  | Manikutty | G06F 16/8365 |
|           |    |   |         |          | 707/999.102 |
| 9,411,806 | B2 | * | 8/2016  | Goyal    | G06F 16/00 |

(Continued)

OTHER PUBLICATIONS

"NoSQL", Wikipedia, Available online at: https://en.wikipedia.org/wiki/NoSQL, Accessed From Internet on Jan. 15, 2019, 10 pages.

(Continued)

*Primary Examiner* — Farhan M Syed
(74) *Attorney, Agent, or Firm* — Kilpatrick Townsend & Stockton LLP

(57) ABSTRACT

A system for query optimization by a federation engine is provided. When a data source supports a target feature of an expression of a query in the common query language, the system executes a converter for the data source to convert the target feature to the corresponding feature of the data source query language. The system then submits to the data source a query with the expression with the converted target feature so that the expression is evaluated at the data source and receives query results. When a data source does not support the target feature of the expression, the system submits to the data source a query without the expression and evaluates the expression on the query results returned by the data source. The system then combines the query results based on the evaluation of the expression as the query results of the query.

20 Claims, 11 Drawing Sheets

Logical Plan 101

Optimized Plan 102

(56) References Cited

U.S. PATENT DOCUMENTS

| | | | |
|---|---|---|---|
| 2003/0163461 A1* | 8/2003 | Gudbjartsson | G06F 16/284 |
| 2004/0153435 A1* | 8/2004 | Gudbjartsson | G06F 16/284 |
| 2004/0181543 A1* | 9/2004 | Wu | G06F 16/90328 |
| | | | 707/999.102 |
| 2005/0060647 A1* | 3/2005 | Doan | G06F 16/248 |
| | | | 715/205 |
| 2005/0097084 A1* | 5/2005 | Balmin | G06F 16/8365 |
| 2006/0235840 A1* | 10/2006 | Manikutty | G06F 16/8365 |
| 2015/0324383 A1* | 11/2015 | Goyal | G06F 16/951 |
| | | | 707/713 |
| 2016/0224643 A1* | 8/2016 | Robichaud | G06F 11/3452 |
| 2016/0224659 A1* | 8/2016 | Robichaud | G06F 16/313 |
| 2016/0224676 A1* | 8/2016 | Miller | G06F 16/24544 |
| 2016/0225271 A1* | 8/2016 | Robichaud | G06F 3/0484 |
| 2017/0083573 A1* | 3/2017 | Rogers | G06F 16/2455 |
| 2018/0203899 A1 | 7/2018 | Halterman et al. | |

OTHER PUBLICATIONS

U.S. Appl. No. 15/409,462, Final Office Action dated Aug. 30, 2019, 14 pages.
U.S. Appl. No. 15/409,462, Non-Final Office Action dated Jan. 28, 2019, 12 pages.
U.S. Appl. No. 15/409,462, Notice of Allowance dated Feb. 26, 2020, 11 pages.
Halterman, "Introduction to Apache Calcite", LinkedIn Slideshare, Available online at: https://www.slideshare.net/JordanHalterman/introduction-to-apache-calcite, Oct. 4, 2016, 109 pages.
Zaharia, "Apache Spark", Wikipedia, Available Online at: https://ipfs.io/ipfs/QmXoypizjW3WknFiJnKLwHCnL72vedxjQkDDP1mXWo6uco/wiki/Apache_Spark.html, May 26, 2014, 5 pages.

\* cited by examiner

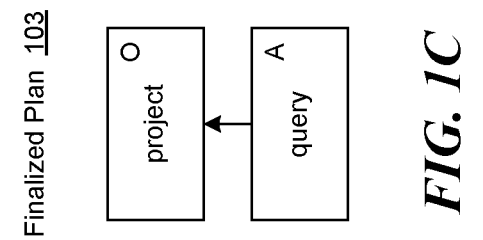
FIG. 1C
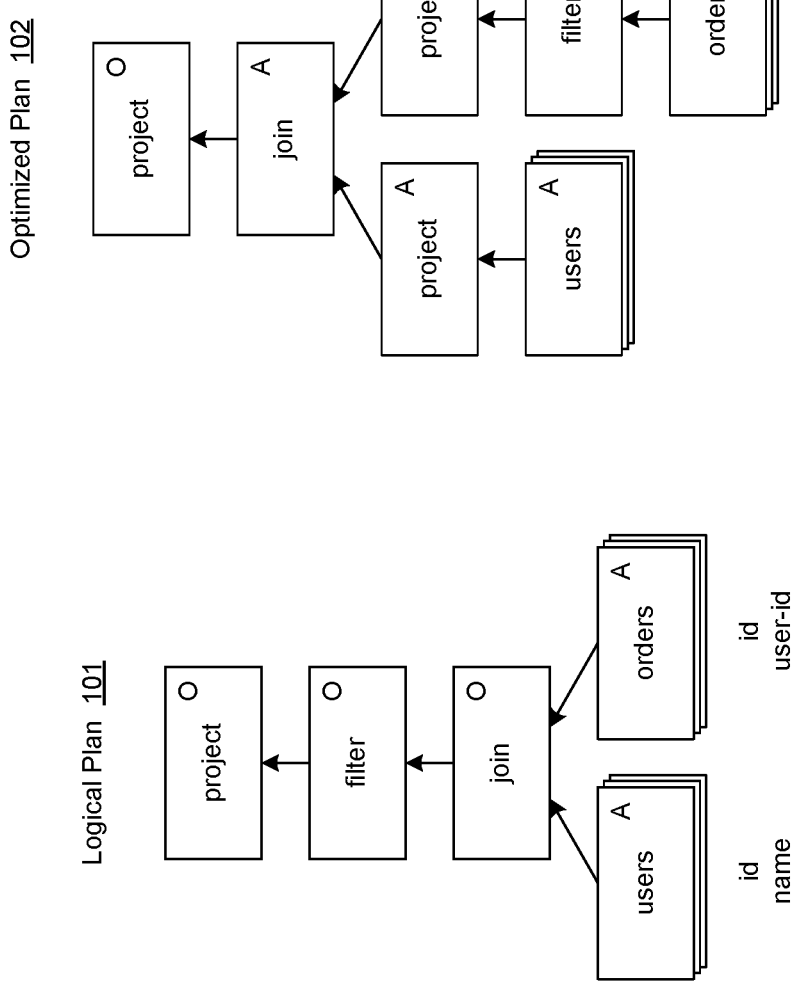
FIG. 1B
FIG. 1A

EXPRESSION PUSHDOWN OPTIMIZATION FOR QUERYING IN FEDERATED DATABASE SYSTEM

CROSS-REFERENCE TO RELATED APPLICATION

This patent application is a continuation of U.S. patent application Ser. No. 15/409,462, filed Jan. 18, 2017, entitled "EXPRESSION PUSHDOWN OPTIMIZATION SYSTEM," which is assigned to the assignee hereof and is hereby incorporated by reference in its entirety for all purposes.

BACKGROUND

Database systems are storing increasing amounts of valuable data. A database system can collect and store millions and billions of new pieces of information every day. For example, a social networking website that is used by hundreds of millions of users on a daily basis may collect information regarding the time of each sign-in, the time of each sign-out, each web page visited, data entered on each webpage, and so on. As another example, a provider of smart phone applications that are used by millions of users may collect the input (e.g., keystrokes) of each user who interacts with the applications and other application-specific data such as location of use, advertisements displayed, advertisements clicked on, and so on. As yet another example, a conglomerate may comprise many corporations that each maintain diverse databases to store information of the corporation such as sales databases, employee databases, customer databases, product databases, and so on.

These various database systems, or more generally data sources, may store data on diverse computer systems that are distributed throughout the world and use diverse query engines. For example, the provider of applications (e.g., for mobile devices) may store the data for each application on a different computing system at a different location. The data sources may store data in various forms such as tables of a relational database, files with comma separated values ("CSVs"), spreadsheet files, fact tables of triples (i.e., subject, predicate, object), eXtensible Markup Language ("XML") files, and so on. These data sources also provide different query engines that may be most appropriate for accessing their own data. For example, the query engines may employ a Structured Query Language ("SQL"), a Simple Protocol and RDF Query Language ("SPARQL"), XML Query ("XQUERY") Language, application-specific application programming interfaces ("APIs"), and so on.

Data scientists are often tasked with extracting knowledge or insights from these data sources. For example, a provider of applications may want to maximize its advertising revenue resulting from advertisements displayed by the applications. A data scientist can help the provider by determining which type of advertisements are most effective for which type of users. Many tools are available to help a data scientist extract knowledge. These tools include machine learning tools, pattern recognition tools, statistical modeling tools, and so on. To use these tools, a data scientist needs to extract the data of interest from the various data sources. It would be very time-consuming and expensive for a data scientist to develop queries to extract data from each of these data sources that may use very different query engines and may be at geographically separated locations.

Federated database systems (also referred to as "federation engines") have been developed to assist a data scientist in such extracting and combining. A federated database system provides a common query engine that employs a common query language for extracting data from data sources. For example, the common query language may be standard SQL. To use the federated database system, a data scientist inputs target queries in the common query language. A target query specifies the data sources of the data and various criteria of the data to be extracted. To process a target query, a federated database system generates a query for each data source that is in the query language of the data source, sends the queries to the data sources, receives the query results, and combines the query results to generate the query results for the target query.

A federated database system could simply extract all the data from each data source, store the data locally, and execute the target query against the locally stored data. Such an approach, however, has several problems. One problem is that it can be very time-consuming and expensive to extract all the data, transmit the extracted data for local storage, and store the data locally. Another problem is that data that is stored locally may become quickly out-of-date unless a complicated and expensive update process is employed.

To help reduce the amount of data that needs to be extracted and transmitted from each resource, a federated database system may push some of the query processing to the various data sources. For example, if a target query includes an expression specifying that only data after a certain date is needed, the federation database system may generate a query for each data source that specifies to extract only data after the certain date. This, of course, may reduce the amount of data that needs to be transmitted from the data sources to the federated database system. Many times the query processing cannot be pushed down to the data sources because of incompatibilities between the common query language and the query languages of the data sources. As a result, vast amounts of data may still need to be transmitted from the data sources to the federated database system.

BRIEF DESCRIPTION OF THE DRAWINGS

FIGS. 1A-C are diagrams that illustrate the pushing down of an expression for an example query of a single data source in some embodiments.

DETAILED DESCRIPTION

Figure 2A:
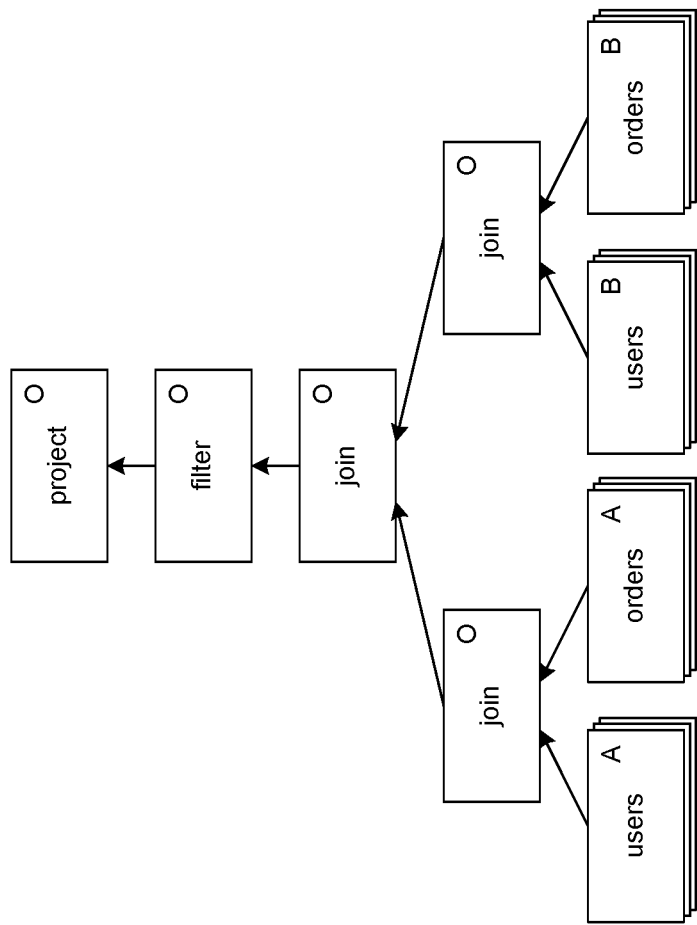
FIGS. 2A-C are diagrams that illustrate the pushing down of an expression for an example query of multiple data sources in some embodiments.

A method and system are provided for query optimization by a federation engine to increase the pushing down of query processing to data sources. In some embodiments, an expression pushdown optimization ("EPO") system of a federation engine is provided that receives a target query specified in a common query language. The target query includes an expression that specifies a target feature such as a target operator or a target type. The common query language may be an SQL-based query language. For example, a target query may be SELECT*FROM items WHERE CAST(price, INTEGER)=0 where "items" is the name of a table, "price" is the name of a column of the items table, and the "cast" operator specifies to convert prices to an integer type, which is a target type. The "CAST(price, INTEGER)=0" is an expression of the target query. As another example, a target query may be SELECT price FROM items WHERE price>99 where ">" is a greater-than operator, which is a target operator. The "price>99" is an expression of the target query.

The EPO system determines whether each data source supports the target feature and thus whether an expression with the target feature can be pushed down to the data source. To support this determination, when a data source is to be used by the EPO system, a data engineer may create a table that identifies the features of the common query language that are supported by the query language of the data source ("data source query language") and may specify how to convert expressions with each target feature into a form that is supported by the data source query language. For example, a data engineer may create a table that specifies that the greater-than operator is supported by a data source and that the expression may be converted by replacing the ">" with "GT." Since most data sources likely support the ">" name for the greater-than operator, the table for each data source may specify that the converted expression is the same as the expression itself.

For each data source that supports an expression of a target query, the EPO system generates a query with the converted expression that is specific to that data source. The federation engine submits to the data source the query and receives from the data source the query results. For example, the following query may be submitted to a data source:

SELECT price FROM items WHERE price GT 99

A converted expression may also include converted operands. For example, if the data source query language expects an integer to be in hexadecimal form, the expression may be converted to "price GT 63."

If, however, a data source does not support a target feature, the EPO system generates a query without the expression. For example, if a data source does not support the greater-than operator, the EPO system may generate the following query for a data source:

SELECT price from FROM items

After submitting a query to a data source, the federation engine receives from the data source initial query results that are not based on evaluation of the expression. In this example, the query results would include the price of each row of the items table. The federation engine then generates, from the initial query results, query results based on evaluation of the expression. That is, the federation engine filters out those prices that do not satisfy the expression—i.e., prices not greater than 99. The federation engine then generates query results for the target query by combining the query results based on evaluation of the expression either by data sources that support the target feature or by the federation engine for data sources that do not support the target feature.

In some cases, although a data source may not support a target feature, the EPO system may generate a query with an expression that does not use the target feature but will return the same query results as if the data source did support the target feature. For example, if a data source does not support the greater-than operator, the EPO system may generate the following query:

SELECT price FROM items WHERE rshift(str(price),2) IS NOT empty where the "str" operator converts the price to a string and the "rshift" operator shifts the price string two digits to the right, and the "IS NOT" operator returns true when the right-shifted string is not empty (i.e., has a value that is greater than 99). Assuming the prices are integers, then the string resulting from shifting a price two digits to the right is an empty string for prices 99 or less is empty and an non-empty string for prices greater than 99.

In this way, the EPO system can push down expressions to data sources even though the data sources use different naming conventions for types and operators and use different representations of operands. Moreover, the EPO system can push down an expression to those data sources that support the expression and not push down the expression to those data sources that do not support the expression. This maximizes the pushing down of expressions and minimizes the computational and communication resources needed to process a target query.

Data sources can support different sets of types and may use different names to represent the different types. For example, some data sources may support a double precision type, but others may not. Moreover, those data sources that support the double precision type may use different names for the same type such as "double_float" or "double." So, when casting to a type of double precision, some data sources may expect the expression:

CAST(speed, DOUBLE)

while others expect the expression:

CAST(speed, DOUBLE_FLOAT)

To support converting expressions that specify types to the forms supported by the various data sources, the EPO system may be provided with a type conversion table (e.g., generated by a data engineer), which is also referred to as a type table, for each data source. The type table for a data source identifies type converters (e.g., functions) for converting types of the common query language to types supported by that data source. The type converters may be named based on the name of the type supported by the common query language. For example, if the common query language supports a type name "double," then a converter may have the following signature:

doubleConverter (in, out)

where "in" is the expression in the common query language and "out" is the converted expression in a data source language. Alternatively, a converter may not receive any input, but simply return the name of the type for the data source, which the EPO system then uses to generate the converted expression. For consistent processing of all data sources, the type table for a data source may include a converter for each type supported by the common query language that the data source also supports. So, even if a data source supports the name "double," the type table for the data source would identify a doubleConverter that returns the input expression as the output expression.

Data sources can support different sets of operators with different behavior and may use different names to represent the operators. For example, some data sources may support a day-of-week operator, with a date operand, that returns the day of the week for that date, but others may not. Those data sources that support the day-of-week operator may have different behaviors such as based on whether Sunday or Monday is the first day of a week or whether the first day of the week should be represented as a zero or a one. Also, the data sources may have different operators for retrieving the day of week such as a "DAYOFWEEK" operator or an "EXTRACT" operator with a "DOW" parameter. Similar to having a type table provided for each data source, the EPO system may be provided with an operator conversion table, which is also referred to as an operator table, for each data source. The operator table for a data source identifies a converter for each operator to convert expressions that use that operator. For example, an operator table for a data source that supports the day-of-week operator may identify a converter named dowConverter. As an example, the following query returns the identifier of orders that were placed on a Monday:

SELECT id FROM orders WHERE DAYOFWEEK (date_placed)=1 where "id" is the identifier of an order, "orders" is the orders table, and "DAYOFWEEK" is the day-of-week operator for the common query language with the behavior that Monday is the first day of the week. If a data source supports the retrieval of the day of week with the "EXTRACT" operator and Sunday as the first day of the week, then the dowConverter for that data source may convert the expression resulting in the following query that is to be submitted to the data source:

SELECT id FROM orders WHERE EXTRACT(DOW FROM date_placed)−1=1

If an expression for retrieving the day of week cannot be pushed down to the data source, then the EPO system generates a query to the data source such as:

SELECT id, date_placed FROM orders AS initialqueryresult

The federated engine submits the query to the data source, and the data source returns the initial query results that include a row for each order of the orders table. To generate the final query result, the federation engine further processes the initial query results by performing the following query:

```
SELECT id FROM initialqueryresult
    WHERE DAYOFWEEK(date_placed) = 1
```

In contrast, if the expression can be pushed down, then the EPO system generates a query for the data source such as:

```
SELECT id FROM orders
    WHERE EXTRACT(DOW FROM date_placed)-1 = 1
```

In such a case, the query returns query results that include a row for only those orders that were placed on Monday, and the federation engine would not need to further process the query results as the returned query results are the final query results.

If a query is to be submitted to multiple data sources, then the query may be represented as:

```
SELECT id, date_placed FROM DSA.orders UNION
    SELECT id, date_placed FROM DSB.orders
    WHERE EXTRACT(DOW FROM date_placed) = 1
``` where "DSA" represents data source A and "DSB" represents data source B. For such a query, the EPO system would generate for those data sources that support the day-of-week operator a query with the expression and to those data sources that do not support it a query without the expression. The EPO system notifies the federation engine of those expressions that cannot be pushed down. When the initial query results from those data sources that do not support expression are returned, the federation engine then performs a query on the initial query results to identify the rows that match the expression. The federation engine then combines the query results of the data sources into a final query result. By pushing down the expression to at least some of the data sources, the communication and computational expense of transmitting a row for every order can be avoided for those data sources. In addition, when an expression is pushed down to multiple data sources, the expression can be evaluated in parallel by the data sources. Thus, because of the parallel evaluation of an expression by the data sources and the reduction in the amount of data that is transmitted from the data sources, the response time in providing the final query results can be significantly less than if the expression was not pushed down to any data sources.

FIGS. 1A-C are diagrams that illustrate the pushing down of an expression for an example query of a single data source in some embodiments. The example query is SELECT u.id, u.name, o.id
FROM users u LEFT JOIN orders o ON u.id=o.userid
WHERE u.id>50

The users table and the orders table are at data source A. A logical plan 101 (FIG. 1A) indicates that the project, filter, and join relational expressions are performed by a federation engine as indicated by the O's in the blocks and the table scan relational expressions for the users table and the orders table are pushed down to the data source A as indicated by the A's in the blocks. The EPO system generates an optimized plan 102 (FIG. 1B) based on pushing down relational expressions and row-level expressions to data source A. In this case, the filter expression and the row-level expression ("u.id>50") are pushed down to data source A. The join expression is also pushed down. Since only certain columns of the tables are needed (i.e., u.id, u.name, and o.id), a project expression for each table is also pushed down so that not all of the columns are returned by the data source. The EPO system then generates a finalized plan 103 (FIG. 1C) by generating a query for data source A based on the type table and the operator table for data source A. In this example, the query for the data source is SELECT u.id, u.name, o.id
FROM users u, orders o ON u.id=o.userid
WHERE u.id>50

In this example, the name of the left join operator for the common query language is "LEFT JOIN" and for data source A is a comma-delimited list of the columns on which the tables are to be joined." Thus, the left joinConverter for data source A converted the left join expression.

Figure 2C:
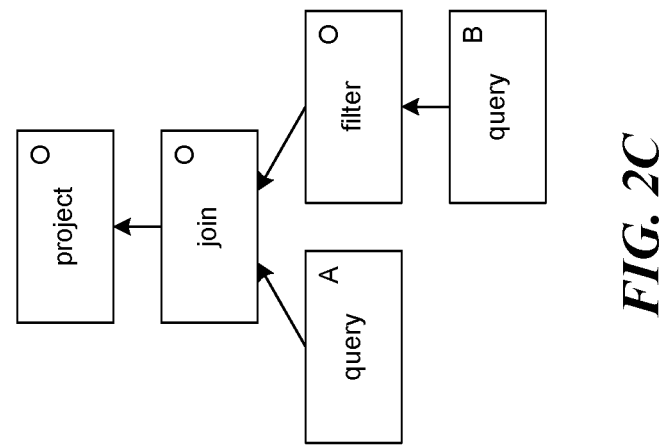
Figure 2B:
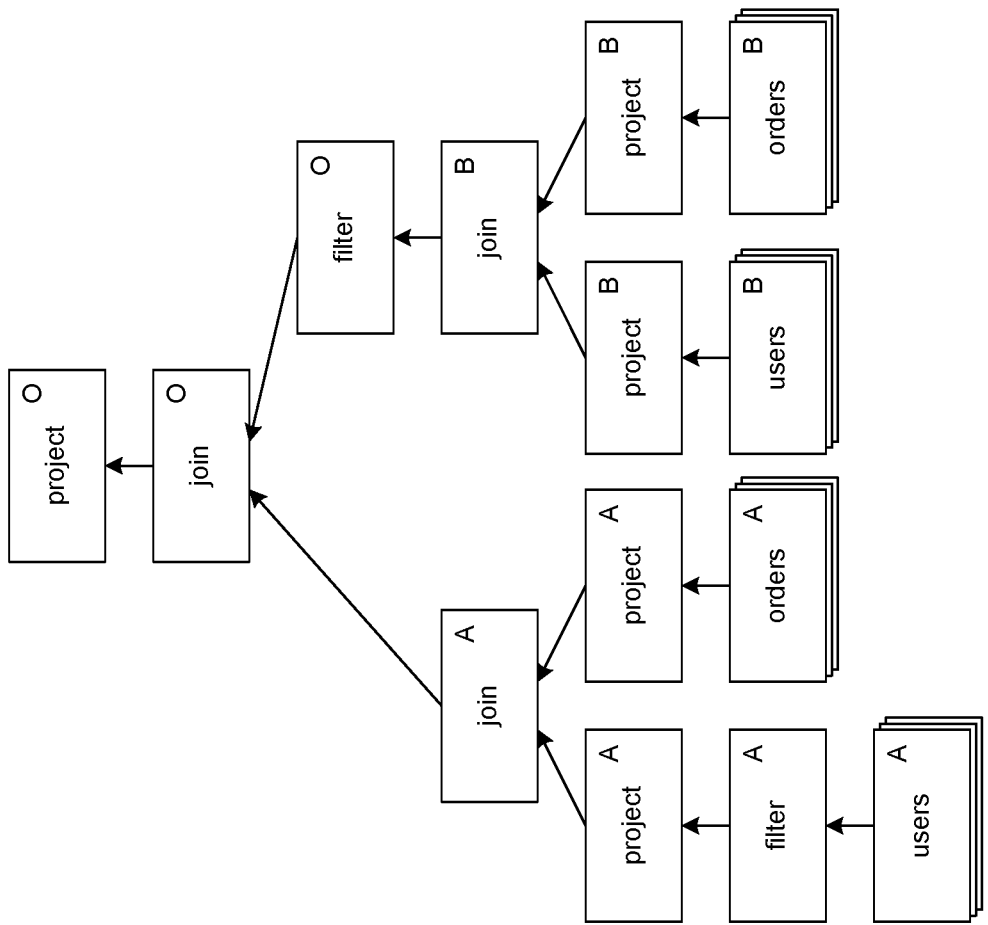

FIGS. 2A-C are diagrams that illustrate the pushing down of an expression for an example query of multiple data sources in some embodiments. The example query is the same as that for FIGS. 1A-C. Data sources A and B each have a users table and an orders table. A logical plan 201 (FIG. 2A) indicates that only the table scan expressions are pushed down to the data sources. An optimized plan 202 (FIG. 2B) generated by the EPO system pushes down expressions for data source A as in the example of FIGS. 1A-C. In this example, data source B does not support the greater-than operator. As a result, the EPO system only pushes down project expressions and a join expression to data source B. The filter expression with the row-level expression containing the greater-than operator was not pushed down, and the row-level expression thus needs to be evaluated by the federation engine against the initial query results returned by data source B. A finalized plan 203 (FIG. 2C) indicates that the greater-than operator needs to be evaluated by the EPO system for data source B, but not for data source A. In some embodiments, the EPO system may support multiple common languages. For example, the EPO system may support common languages such as different versions of SQL, Pig Latin of Apache Pig, SPARQL, QBE, and so on. To process a query in any of the supported query languages, the EPO system may convert each query regardless of the language into an intermediate representation such as an abstract syntax tree. The EPO then uses the abstract syntax tree to generate the logical plan.

Figure 3:
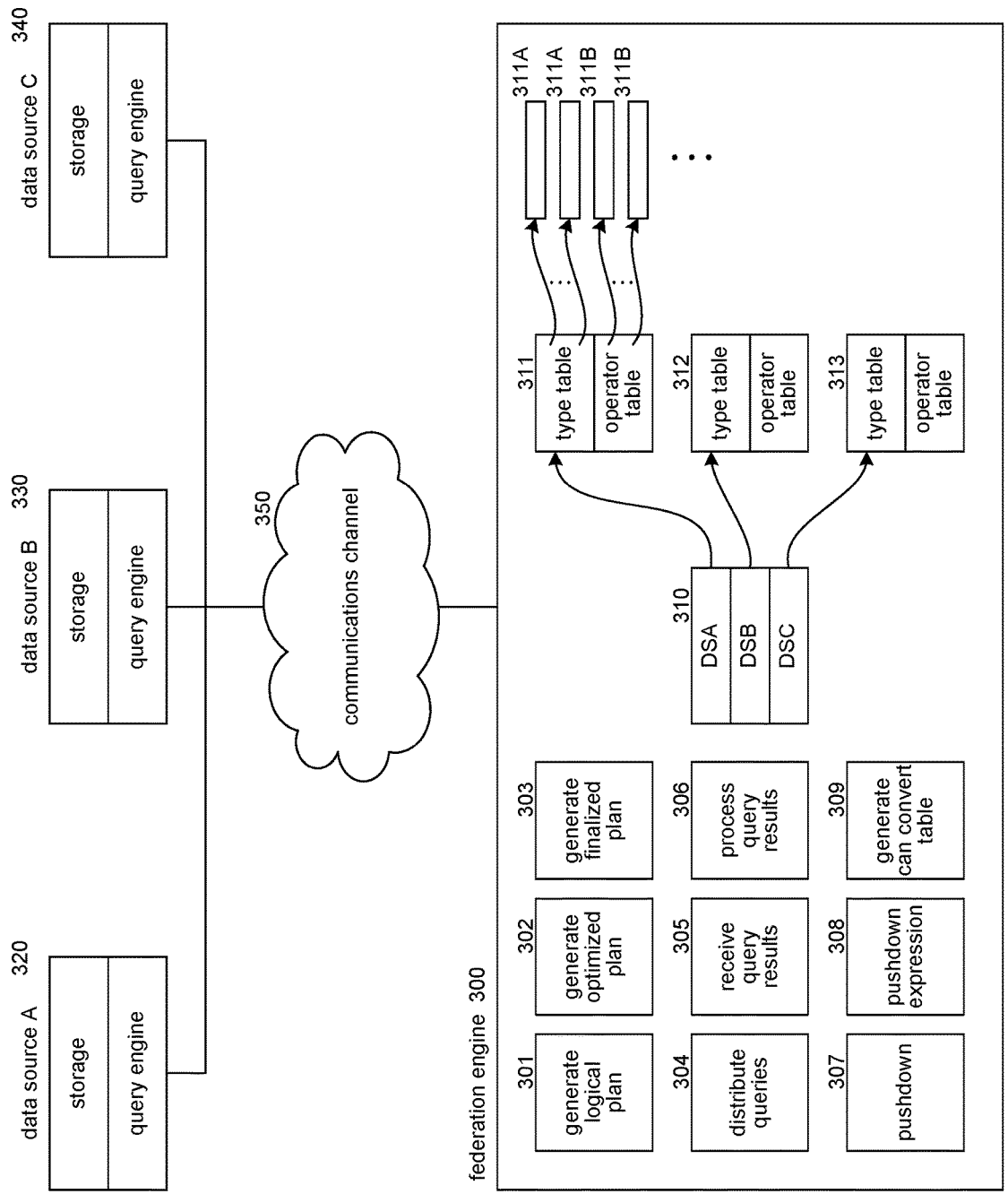
FIG. 3 is a block diagram illustrating components of a federation engine that uses the EPO system in some embodiments.

FIG. 3 is a block diagram illustrating components of a federation engine that uses the EPO system in some embodiments. A federation engine 300 is connected to data sources 320, 330, and 340 via a communications channel 350. Each data source includes a query engine and storage for the data of the data source. The federation engine includes a generate logical plan component 301, a generate optimized plan component 302, and a generate finalized plan component 303. The generate optimized plan component and the generate finalized plan component implement aspects of the EPO system. The federation engine also includes a distribute queries component 304, a receive query results component 305, and a process query results component 306. The distribute queries component distributes the queries of the finalized plan to the data sources. The receive query results component receives the query results from the data sources. The process query results component combines the query results of the queries into final query results. The process query results component also performs additional evaluations for types and expressions that could not be pushed down to the data sources. The federation engine also includes a pushdown component 307, a pushdown expression component 308, and a generate can convert table component 309. The pushdown component pushes down expressions to each data source. The pushdown expression component pushes down expressions to a single data source. The generate can convert table generates a table that specifies whether a data source has a converter for each common type and common operator of the common query language. The can convert table is accessed to determine whether expressions can be pushed down to the data sources. The federation engine also includes a data source table 310 with an entry for each data source that points to the type and operator tables 311-313 for each data source. The type and operator tables may include references to functions 311A for converting types and functions 311B for converting expressions.

The computing systems of a federation engine that employs the EPO system may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the EPO system. The data transmission media are used for transmitting data via transitory, propagating signals or carrier waves (e.g., electromagnetism) via a wired or wireless connection.

The EPO system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the EPO system may be implemented in hardware using, for example, an application-specific integrated circuit (ASIC).

Figure 4:
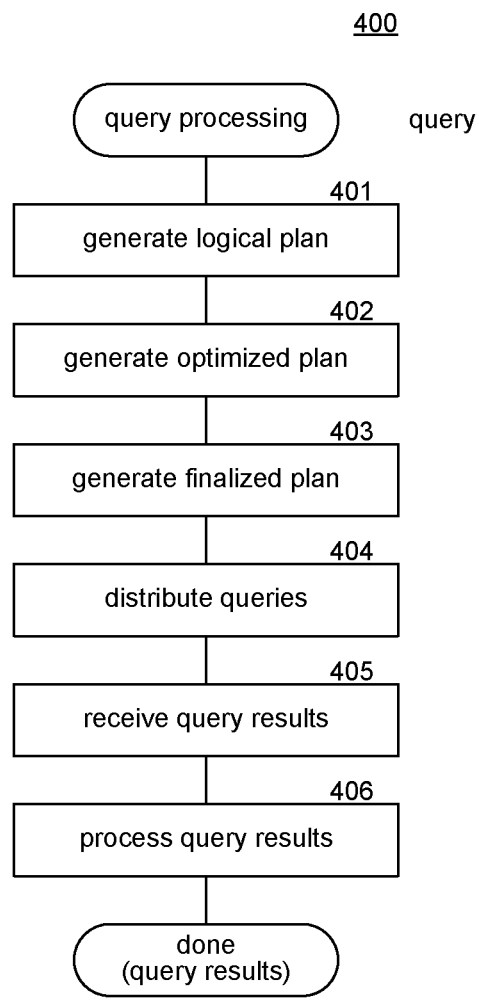
FIG. 4 is a flow diagram that illustrates the overall processing of the query processing function of a federation engine in some embodiments.

FIG. 4 is a flow diagram that illustrates the overall processing of the query processing function of a federation engine in some embodiments. A query processing component 400 is provided a target query and returns query results that are collected from one or more data sources. In block 401, the component initially invokes the generate logical plan component to generate a logical plan for the target query. In block 402, the component invokes the generate optimized plan component to generate an optimized plan for the target query. The generate optimized plan component may access the can convert table of each data source to determine which common types and common operators can be pushed down to each data source. In block 403, the component invokes the generate finalized plan component to generate the finalized plan for the target query. The generate finalized plan component generates a query for each data source that is to be submitted to each data source in accordance with the optimized plan that includes relational expressions and row-level expressions pushed down to the data sources. In block 404, the component distributes the query for each data source to the data source. In block 405, the component invokes a receive query results component to receive query results from each data source. In block 406, the component invokes a process query results component to evaluate expressions that could not be pushed down and to combine the query results into query results for the target query. The component then completes.

Figure 5:
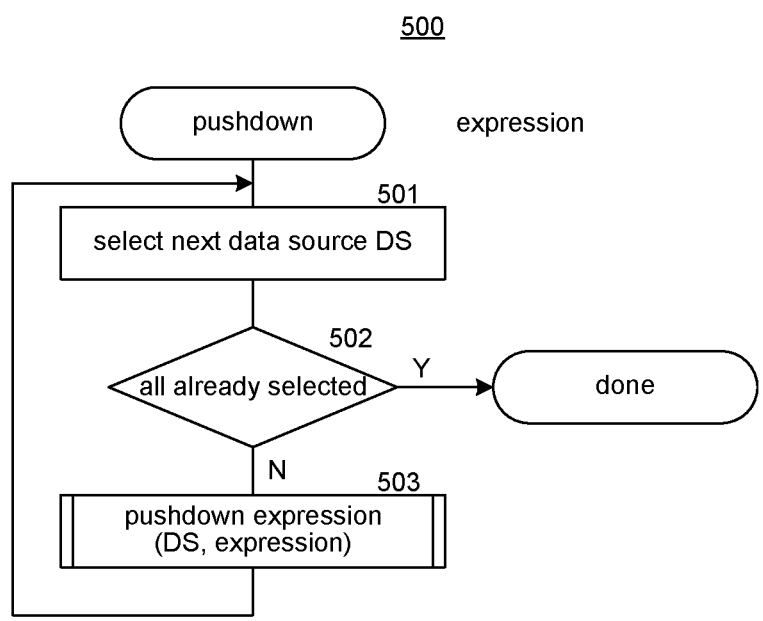
FIG. 5 is a flow diagram that illustrates the processing of a pushdown component in some embodiments.

FIG. 5 is a flow diagram that illustrates the processing of a pushdown component in some embodiments. A pushdown component 500 is invoked by the optimized plan component passing an expression to determine whether the expression can be pushed down to one or more data sources. In block 501, the component selects the next data source. In decision block 502, if all the data sources have already been selected, then the component completes, else the component continues at block 503. In block 503, the component invokes the pushdown expression component passing an indication of the selected data source and the expression. The component then loops to block 501 to select the next data source.

Figure 6:
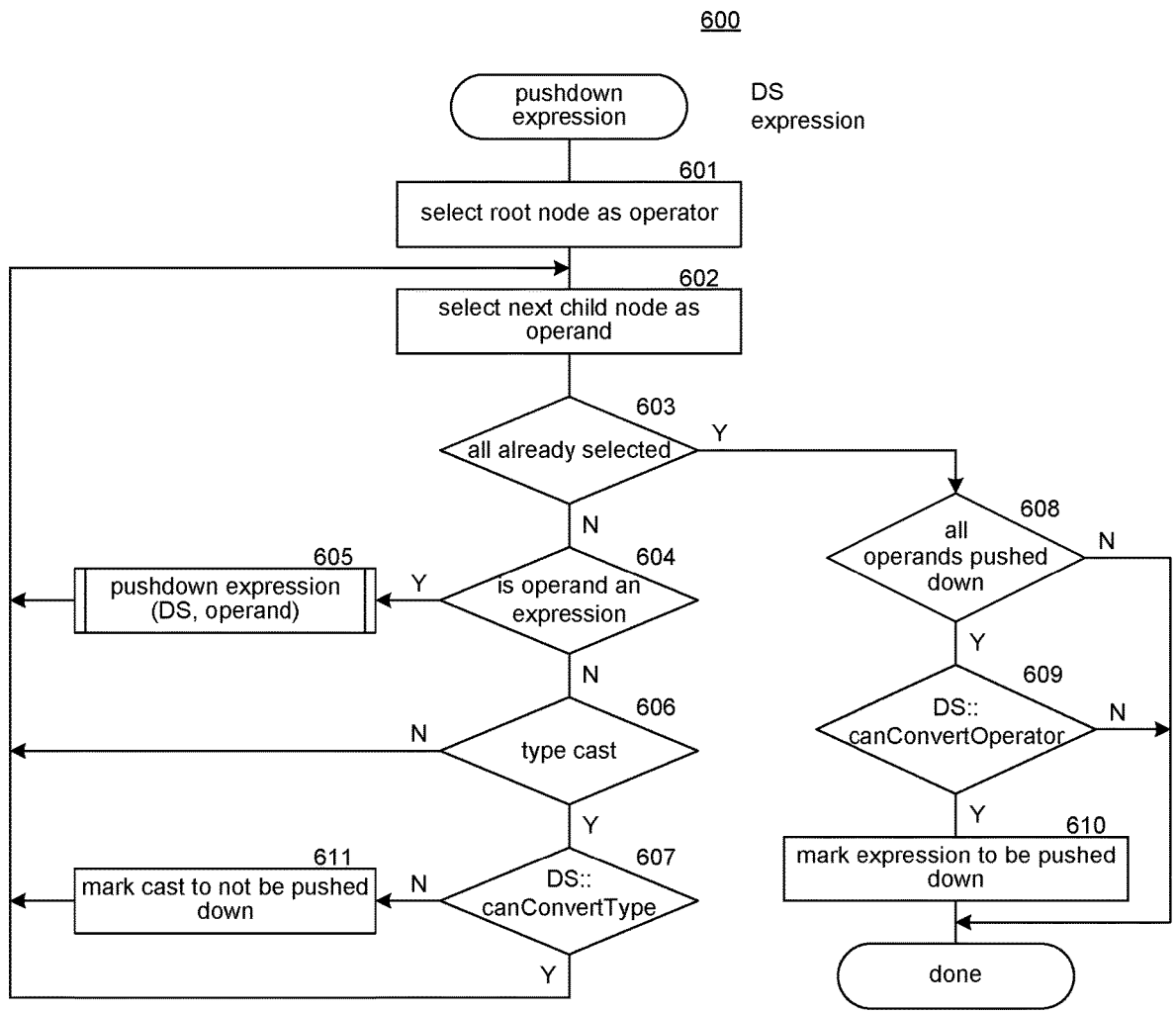
FIG. 6 is a flow diagram that illustrates the processing of a pushdown expression component in some embodiments.

FIG. 6 is a flow diagram that illustrates the processing of a pushdown expression component in some embodiments. A pushdown expression component 600 is invoked passing an indication of a data source and an expression. The pushdown expression component determines whether the expression can be pushed down to the data source. In block 601, the component selects a root node of the expression as the operator. The expression may be represented as a tree with the root node representing an operator and child nodes representing operands of their parent node. A child node may be a sub-tree (representing an expression to be evaluated to generate the operand) with an operator at its root node. In blocks 602-607, the component loops selecting child nodes of the root node of the expression. In block 602, the component selects the next child node as an operand for the operator. In decision block 603, if all the child nodes have already been selected, then the component continues at block 608, else the component continues at block 604. In decision block 604, if the operand of the selected child node is an expression, then the component continues at block 605, else the component continues at block 606. In block 605, the component recursively invokes the pushdown expression component passing an indication of the data source and the operand as an expression and then loops to block 602 to select the next child node. In decision block 606, if the operand indicates that it should be cast to a type, then the component continues at block 607, else the component loops to block 602 to select the next child node. In decision block 607, if the data source can convert to the specified type, then the component loops to block 602 to select the next child node, else the casting for the type cannot be pushed down and the component marks that the casting cannot be pushed down in block 611 and loops to block 602 to select the next child node. In decision block 608, if evaluation of all the operands (of the operator of the root node) can be pushed down, then the component continues at block 609, else the expression cannot be pushed down and the component completes). In decision block 609, if the data source indicates that the operator of the expression can be pushed down, then the component continues at block 610, else the component completes. In block 610, the component marks the expression to be pushed down and then completes.

Figure 7:
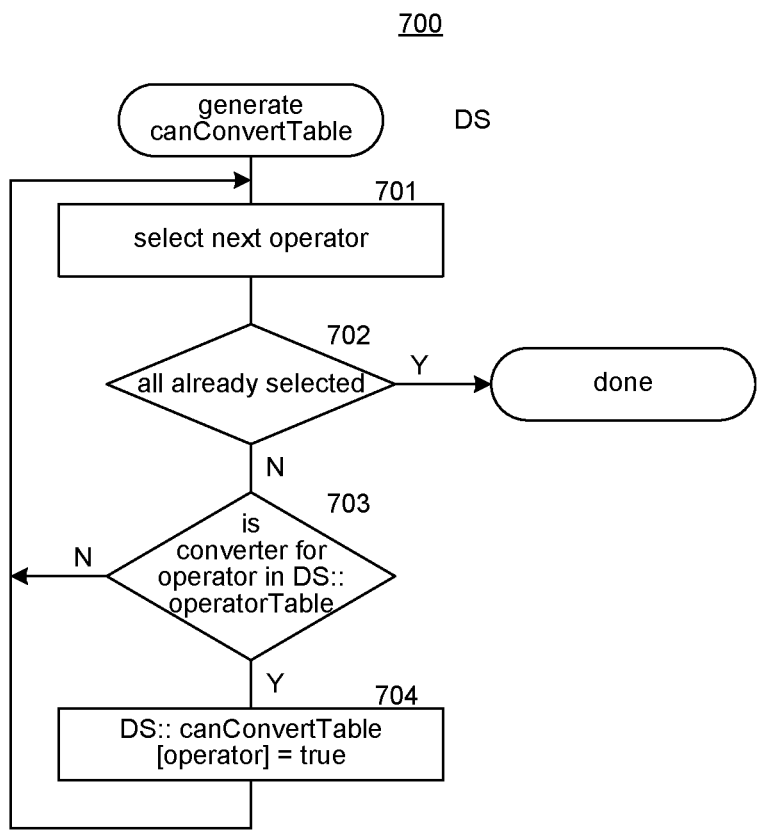
FIG. 7 is a flow diagram that illustrates the processing of a generate can convert table component for operators in some embodiments.

FIG. 7 is a flow diagram that illustrates the processing of a generate can convert table component for operators in some embodiments. A generate can convert table component 700 determines whether a converter has been defined in the operator table for each common operator of the common query language for a data source. If so, the component sets a flag in the can convert table for the data source. The can convert table for a data source may be initialized to values of false. In block 701, the component selects the next common operator. In decision block 702, if all the common operators have already been selected, then the component completes, else the component continues at block 703. In decision block 703, if a converter is defined for the selected operator in the operator table for the data source, then the component continues at block 704, else the component loops to block 701 to select the next operator. In block 704, the component sets the value for the selected operator in the can convert table of the data source to true and then loops to block 701 to select the next operator. Although not illustrated, the EPO system may employ a similar function for determining whether the various data sources can convert types.

Figure 8:
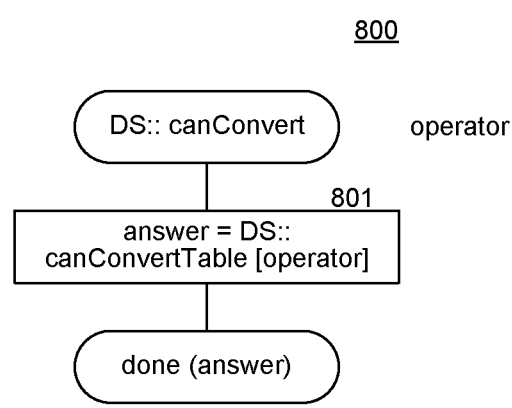
FIG. 8 is a flow diagram that illustrates the processing of a can convert component for operators in some embodiments.

FIG. 8 is a flow diagram that illustrates the processing of a can convert component for operators in some embodiments. A can convert component 800 is invoked to determine whether a data source can convert an operator. In block 801, the component retrieves the value for the operator from the can convert table of the data source as an answer. The component then completes returning an indication of the answer.

Figure 9:
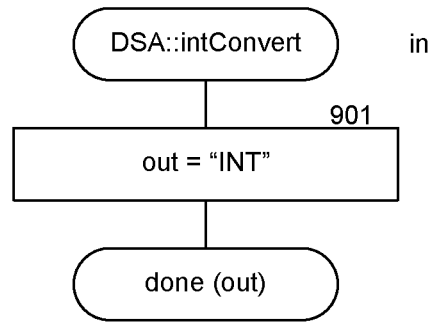
FIGS. 9 and 10 are flow diagrams that illustrate the processing of a converter for an integer type in some embodiments.
Figure 10:
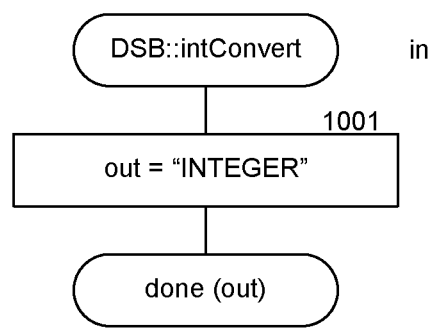

FIGS. 9 and 10 are flow diagrams that illustrate the processing of a converter for an integer type in some embodiments. In this example, the common name of the integer type is "INT." In this example, data sources A and B support the integer type, but data source C does not. In FIG. 9, an intConvert component 900 is defined for data source A and may be passed an indication of the common name as an input value. In this example, data source A supports the common name. In block 901, the component sets an output value to "INT." The component then completes. In FIG. 10, an intConvert component 1000 is defined for data source B. In this example, data source B does not support the common name. In block 1001, the component sets the output value to "INTEGER." The component then completes. In this example, since data source C does not support the integer type, an intConvert component is not defined for data source C. As a result, when the can convert table for types is generated, the tables for data sources A and B would indicate that a converter for the integer type is defined, and the table for data source C would indicate that a converter for the integer type is not defined.

Figure 11:
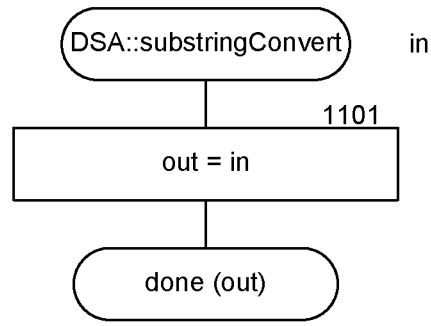
FIGS. 11 and 12 are flow diagrams that illustrate the processing of a converter for a substring operator in some embodiments.
Figure 12:
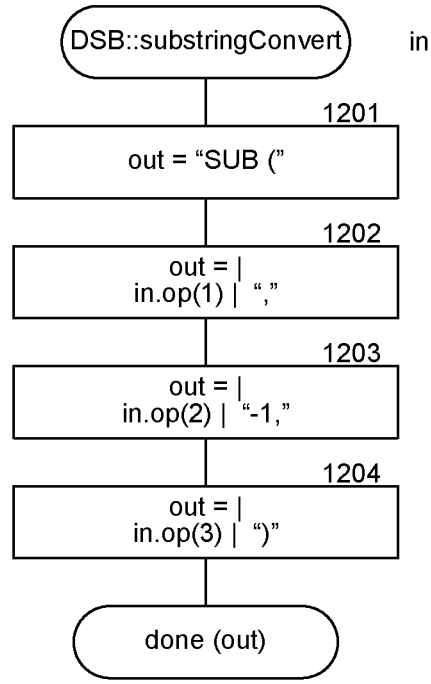

FIGS. 11 and 12 are flow diagrams that illustrate the processing of a converter for a substring operator in some embodiments. In this example, the common name of the substring operator is "SUBSTRING." In this example, data sources A and B support the substring type, but data source C does not. Although data source B supports the substring type, it uses a different name and supports a different behavior in that the substring is indexed starting at zero whereas the behavior of the common substring operator is indexed starting at one. The following is an example of a substring expression of the common query language SUBSTRING(data, 1, 5)

This expression returns the first of five characters of the data. The equivalent substring expression for data source B is SUB(data, 0, 5)

In FIG. 11, a substringConvert component 1100 defined for data source A may be passed an indication of an expression as an input value. In block 1101, since data source A supports the common substring operator, the component sets the output value to the input value and then completes. In FIG. 12, a substringConvert component 1200 defined for data source B may be passed an indication of an expression as an input value. In block 1201, the component initializes the output value to "SUB (". In block 1202, the component appends to the output value the first operand of the expression (e.g., "data") followed by a comma. In block 1203, the component appends to the output value the second operand of the expression followed by "−1," to effect the adjustment of the start of the substring. In block 1204, the component appends to the output value the third operand followed by ")". The component then completes returning the following output value:

SUB(data, 1-1, 5)

In this example, since data source C does not support the substring operator, a substringConvert component is not defined for data source C. As a result, when the can convert table for operators is generated, the tables for data sources A and B would indicate that a converter for the substring operator is defined, and the table for data source C would indicate that a converter for the substring operator is not defined.

The following paragraphs describe various embodiments of aspects of the EPO system. An implementation of the secure key system may employ any combination of the embodiments. The processing described below may be performed by a computing device with a processor that executes computer-executable instructions stored on a computer-readable storage medium that implements the EPO system.

In some embodiments, a method performed by a computing system for query optimization in a federated database system is provided. The method receives a target query specified in a common query language. The target query includes an expression specifying to represent an operand as a common name of a target type. For each of a plurality of data sources, the method performs the following. The method provides a type table that maps common names of types of the common query language to corresponding data source names of types of a data source query language for the data source. The method accesses the type table for the data source to determine whether the data source has a data source name corresponding to the common name of the target type. When the data source supports the target type, the method generates a query for the data source that includes a converted expression with the data source name so the expression can be evaluated at the data source. When the data source does not support the target type, the method generates a query for the data source that does not include the expression so that the expression is not evaluated at the data source. In some embodiments, the method further, for each of the plurality of data sources that supports the target type, submits the query for the data source to the data source and receiving query results, and for each of the plurality of data sources that does not support the target type, the method evaluates the expression on the received query results for the data source. In some embodiments, the expression includes a cast operator that specifies that an operand of the expression is to be cast to the target type for evaluation of the expression. In some embodiments, the type table for a data source includes a converter for common types that when invoked returns the converted expression. In some embodiments, the data source name for a data source and the common name are the same.

In some embodiments, a method performed by a computing system for query optimization in a federated database system is provided. The method receives a target query specified in a common query language, the target query including an expression specifying a target operator. For each of a plurality of data sources, the method performs the following. The method provides an operator table for the data source that specifies converters for converting expressions with common operators of a common query language to a form supported by the data source. When the data source supports the operator of the expression, the method identifies the converter for the target operator specified by the operator table for the data source, invokes the identified converter passing an indication of the expression, receives from the invoked converter a converted expression that is in a form supported by the data source, and generates a query for the data source that includes the converted expression so that the expression can be evaluated at the data source. When the data source does not support the operator of the expression, the method generates a query for the data source that does not include the expression so that the expression is not evaluated at the data source. In some embodiments, the method further, for each of the plurality of data sources that supports the operator of the expression, submits the query for the data source to the data source and receiving query results. The method also, for each of the plurality of data sources that does not support the operator of the expression, evaluates the expression on the received query results for the data source. In some embodiments, the target operator includes a common operator name and the invoked converter for a data source is adapted to change the common operator name of the expression to an operator name that is specific to the data source. In some embodiments, the expression includes an operand and the invoked converter for a data source is adapted to change the operand. In some embodiments, the expression and the converted expression specify equivalent behavior. In some embodiments, the form supported by a data source is the same as the form supported by the common query language. In some embodiments, the method further, when the data source does not support an operator of the expression but the data source does support one or more other operators through which equivalent behavior can be performed, generates a query for the data source that includes an expression with one or more operators through which the equivalent behavior can be performed.

In some embodiments, a computing system for query optimization in a federated database system is provided. The computing system comprises a computer-readable storage medium storing computer-executable instructions and a processor for executing the computer-executable instructions stored in the computer-readable storage medium. The computer-executable instructions include instructions that, when executed, control the computing system to receive a target query specified in a common query language, the target query including an expression that specifies to represent an operand as a target type. The instructions further control the computing system to, for each of a plurality of data sources, when a data source supports the target type, submit to the data source a query with the expression wherein the expression is converted when the common query language and a data source query language of the data source use different names for the target type and receive from the data source query results based on evaluation of the converted expression, and when the data source does not support the target type, submit to the data source a query without the expression, receive from the data source initial query results not based on evaluation of the expression, and generate, from the initial query results, query results based on evaluation of the expression. The instructions further control the computing system to generate overall query results for the received target query using the query results based on evaluation of the expression wherein at least one of the data sources uses a different name for the target type or does not support the target type. In some embodiments, the instructions further control the computing system to, for each of the plurality of data sources, access a type table that provides a mapping of common names of types of the common query language to corresponding data source names of types of the data source query language. In some embodiments, the type table for a data source includes a converter for a type that when invoked returns an indication of the data source name for the type. In some embodiments, the expression includes a cast operator that specifies that the operand of the expression is to be cast to the target type for evaluation of the expression.

In some embodiments, a computing system for query optimization in a federated database system is provided. The computing system comprises a computer-readable storage medium storing computer-executable instructions and a processor for executing the computer-executable instructions stored in the computer-readable storage medium. The computer-executable instructions include instructions that receive a target query specified in a common query language, the target query including an expression with a target operator. The instructions control the computing system to, for each of a plurality of data sources, when a data source supports the target operator, submit to the data source a query with the expression wherein the expression is converted when the common query language and a data source query language of the data source support different forms of the target operator and receive from the data source query results based on evaluation of the converted expression, and when the data source does not support the target operator, submit to the data source a query without the expression, receive from the data source initial query results not based on evaluation of the expression, and generate, from the initial query results, query results based on evaluation of the expression. The instructions control the computing system to generate overall query results for the received target query using the query results based on evaluation of the expression wherein at least one of the data sources uses a different form of the target operator or does not support the target operator. In some embodiments, different forms of the target operator vary based on syntax. In some embodiments, different forms of the target operator vary based on semantics. In some embodiments, the instructions further control the computing system to, for each of the plurality of data sources, access an operator table for a data source that specifies converters for operators of the common query language.

In some embodiments, a method performed by a computing system for query optimization in a federated database system is provided. The method receives a target query that includes an expression that specifies a target feature. For each of a plurality of data sources, the method, when a data source supports the target feature, submits to the data source a query with the expression and receives from the data source query results based on evaluation of the expression, and when the data source does not support the target feature, submits to the data source a query without the expression, receives from the data source initial query results not based on evaluation of the expression, and generates, from the initial query results, query results based on evaluation of the expression. The method generates overall query results for the target query using the query results based on evaluation of the expression, wherein at least one of the data sources uses a different form of the target feature or does not support the target feature. In some embodiments, the target feature is a type. In some embodiments, the target feature is an operator. In some embodiments, the query is provided in a common query language, the method further, prior to submitting to the data source the query with the expression, converts the expression to a converted expression when the common query language and a data source query language of the data source support different forms of the target feature and submits to the data source the query with the converted expression. In some embodiments, the method further, for each of the plurality of data sources, accesses feature converters for that data source. The feature converter for a feature converts an expression that includes that feature to a converted feature that is in a form that is supported by the data source. In some embodiments, the method further generates a relational tree for the target query and augmenting a relation of the relational tree with the expression. In some embodiments, the query with the expression that is submitted to a data source specifies the relation that the expression augments.

In some embodiments, a method performed by a computing system for query optimization is provided. The method accesses converters for a data source. The converters are for converting features of a common query language to corresponding features of a data source query language of the data source. When the data source supports a target feature of an expression of a query in the common query language, the method executes a converter to convert the target feature to the corresponding feature of the data source query language and submits submitting to the data source a query with the expression with the converted target feature. When the data source does not support the target feature of the expression, the method submits to the data source a query without the expression. In some embodiments, the query specifies multiple data sources and at least one first data source supports the target feature and at least one second data source does not support the target feature. In some embodiments, a query with the expression with the converted target feature is submitted to a first data source and a query without the expression is submitted to a second data source. In some embodiments, the method further receives from the first data source first query results, receives from the second data source initial second query results not based on evaluation of the expression, and generates, from the initial second query results, second query results based on evaluation of the expression. The method combines the first query results and the second query results to form query results for the query.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computer-implemented method for query optimization in a federated database system, the computer-implemented method comprising:
  receiving a target query specified in a common query language, the target query including an expression specifying a target feature; and
  for each data source of a plurality of data sources,
    accessing a respective converter for converting features of the common query language to corresponding features of a data source query language for the data source, wherein the respective converter is configured for a common type and a common operator of the common query language;
    when the data source supports the target feature specified in the expression of the target query,
      converting, by the respective converter, the target feature specified in the expression to the corresponding feature of the data source query language;
      submitting, to the data source, a first query including a converted expression with the corresponding feature of the data source query language; and
      obtaining query results based on the first query that includes the converted expression; and
    when the data source does not support the target feature specified in the expression of the target query,
      generating a second query that does not include the expression or a converted version of the expression;
      submitting the second query to the data source such that query result data is selected from the data source without being filtered based on the expression;

receiving, from the data source, the query result data; and generating a first query result by filtering the query result data using the expression.

2. The computer-implemented method of claim 1, wherein the plurality of data sources includes:
a first data source that supports the target feature; and
a second data source that does not support the target feature.

3. The computer-implemented method of claim 2, wherein:
the first query is submitted to the first data source;
the second query is submitted to the second data source; and
the query result data is received from the second data source.

4. The computer-implemented method of claim 3, further comprising:
receiving, from the first data source, a second query result; and
combining the first query result and the second query result to form query results for the target query.

5. The computer-implemented method of claim 1, wherein the target feature includes a target operator.

6. The computer-implemented method of claim 5, wherein:
the target operator includes a common operator name; and
the respective converter for the data source is adapted to change the common operator name to an operator name that is specific to the data source.

7. The computer-implemented method of claim 5, wherein:
the expression includes an operand of the target operator; and
the respective converter for the data source is adapted to change the operand.

8. The computer-implemented method of claim 5, further comprising generating, when the data source does not support the target operator but supports one or more other operators through which equivalent operations can be performed, a third query that includes an expression including the one or more other operators.

9. The computer-implemented method of claim 5, wherein accessing the respective converter comprises:
receiving an operator table for the data source, the operator table specifying converters for converting expressions with common operators of the common query language to corresponding expressions with operators supported by the data source; and
identifying the respective converter for the target operator based on the operator table.

10. The computer-implemented method of claim 9, wherein the common operators of the common query language and the operators supported by the data source have are different in syntax or semantics.

11. The computer-implemented method of claim 1, wherein:
the target feature includes a target data type; and
accessing the respective converter comprises:
receiving a data type table that maps data types of the common query language to corresponding data types of the data source query language for the data source, wherein the data type table includes the respective converter that, when invoked, returns the converted expression; and
accessing the data type table to determine whether the data source has a data type corresponding to the target data type to support the target data type.

12. The computer-implemented method of claim 11, wherein the expression includes a cast operator that specifies that an operand of the expression is to be cast to the target data type for evaluation of the expression.

13. The computer-implemented method of claim 1, wherein the expression and the converted expression specify equivalent behaviors.

14. A non-transitory computer-readable storage medium storing computer-executable instructions that, when executed by a processor, cause the processor to perform operations comprising:
receiving a target query specified in a common query language, the target query including an expression specifying a target feature; and
for each data source of a plurality of data sources,
accessing a respective converter for converting features of the common query language to corresponding features of a data source query language for the data source, wherein the respective converter is configured for a common type and a common operator of the common query language;
when the data source supports the target feature specified in the expression of the target query,
converting, by the respective converter, the target feature specified in the expression to the corresponding feature of the data source query language;
submitting, to the data source, a first query including a converted expression with the corresponding feature of the data source query language; and
obtaining query results based on the first query that includes the converted expression; and
when the data source does not support the target feature specified in the expression of the target query,
generating a second query that does not include the expression or a converted version of the expression;
submitting the second query to the data source such that query result data is selected from the data source without being filtered based on the expression;
receiving, from the data source, the query result data; and
generating a first query result by filtering the query result data using the expression.

15. The non-transitory computer-readable storage medium of claim 14, wherein the plurality of data sources includes:
a first data source that supports the target feature; and
a second data source that does not support the target feature.

16. The non-transitory computer-readable storage medium of claim 15, wherein:
the first query is submitted to the first data source;
the second query is submitted to the second data source; and
the query result data is received from the second data source.

17. The non-transitory computer-readable storage medium of claim 16, wherein the operations further comprises:
receiving, from the first data source, a second query result; and combining the first query result and the second query result to form query results for the target query.

18. The non-transitory computer-readable storage medium of claim 14, wherein the target feature includes at least one of a target data type or a target operator.

19. A computing system for query optimization in a federated database system, the computing system comprising:
 a processor; and
 a computer-readable storage medium storing computer-executable instructions that, when executed by the processor, cause the processor to perform operations comprising:
  receiving a target query specified in a common query language, the target query including an expression specifying a target feature; and
  for each data source of a plurality of data sources,
   accessing a respective converter for converting features of the common query language to corresponding features of a data source query language for the data source, wherein the respective converter is configured for a common type and a common operator of the common query language;
   when the data source supports the target feature specified in the expression of the target query,
    converting, by the respective converter, the target feature specified in the expression to the corresponding feature of the data source query language; and
    submitting, to the data source, a first query including a converted expression with the corresponding feature of the data source query language; and
    obtaining query results based on the first query that includes the converted expression; and
   when the data source does not support the target feature specified in the expression of the target query,
    generating a second query that does not include the expression or a converted version of the expression;
    submitting the second query to the data source such that query result data is selected from the data source without being filtered based on the expression;
    receiving, from the data source, the query result data; and
    generating a first query result by filtering the query result data using the expression.

20. The computing system of claim 19, wherein:
 the plurality of data sources includes:
  a first data source that supports the target feature; and
  a second data source that does not support the target feature;
 the first query is submitted to the first data source;
 the second query is submitted to the second data source;
 the query result data is received from the second data source; and
 the operations further comprises:
  receiving, from the first data source, a second query result; and
  combining the first query result and the second query result to form query results for the target query.

* * * * *